A. W. STEIGER.
TYPE WRITING MACHINE.
APPLICATION FILED JAN. 28, 1910.

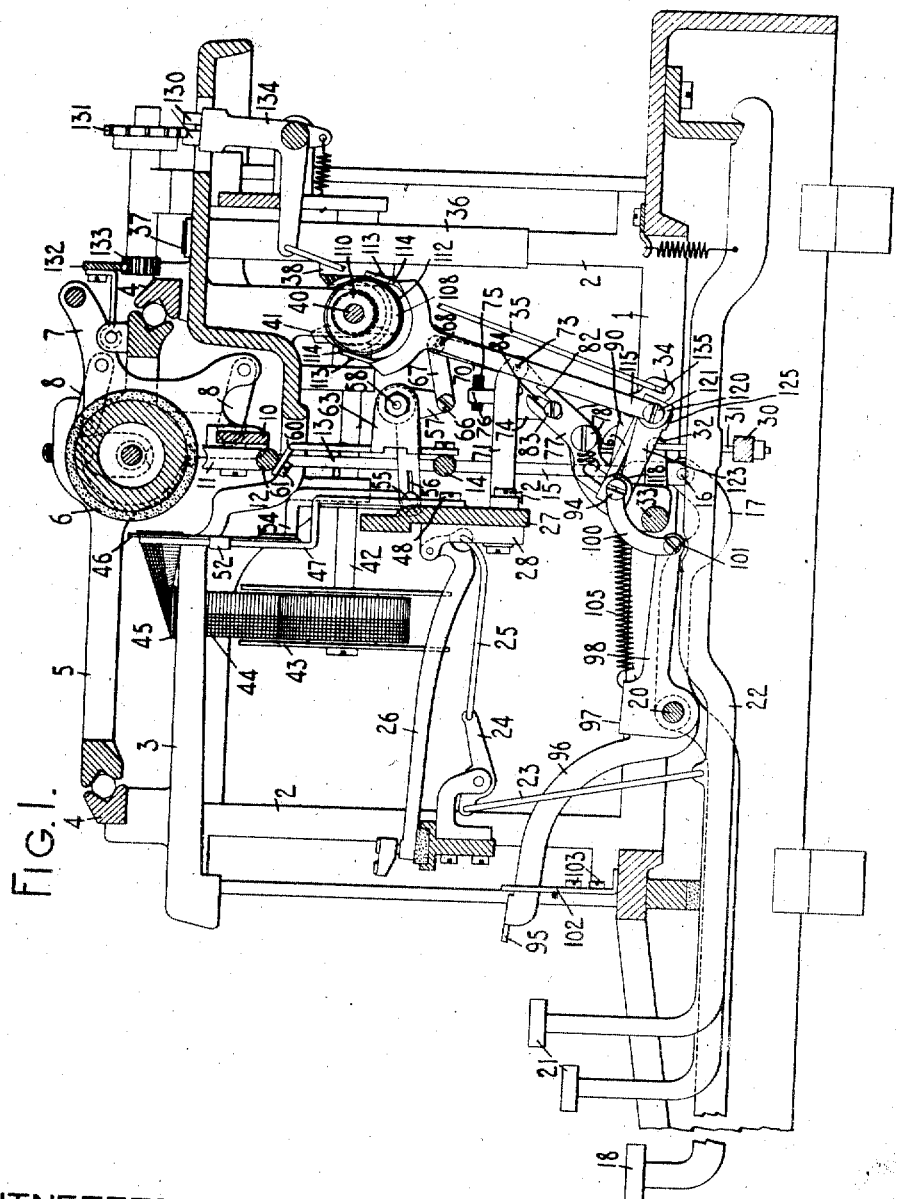

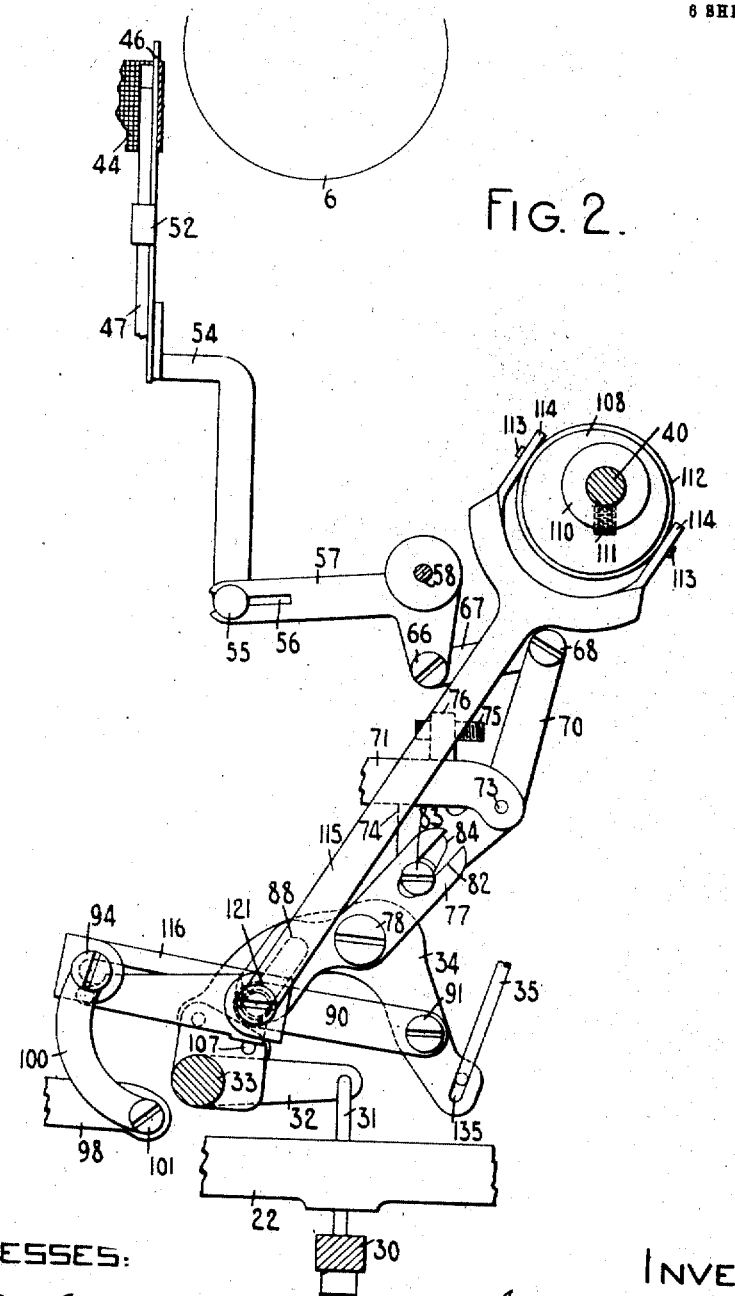

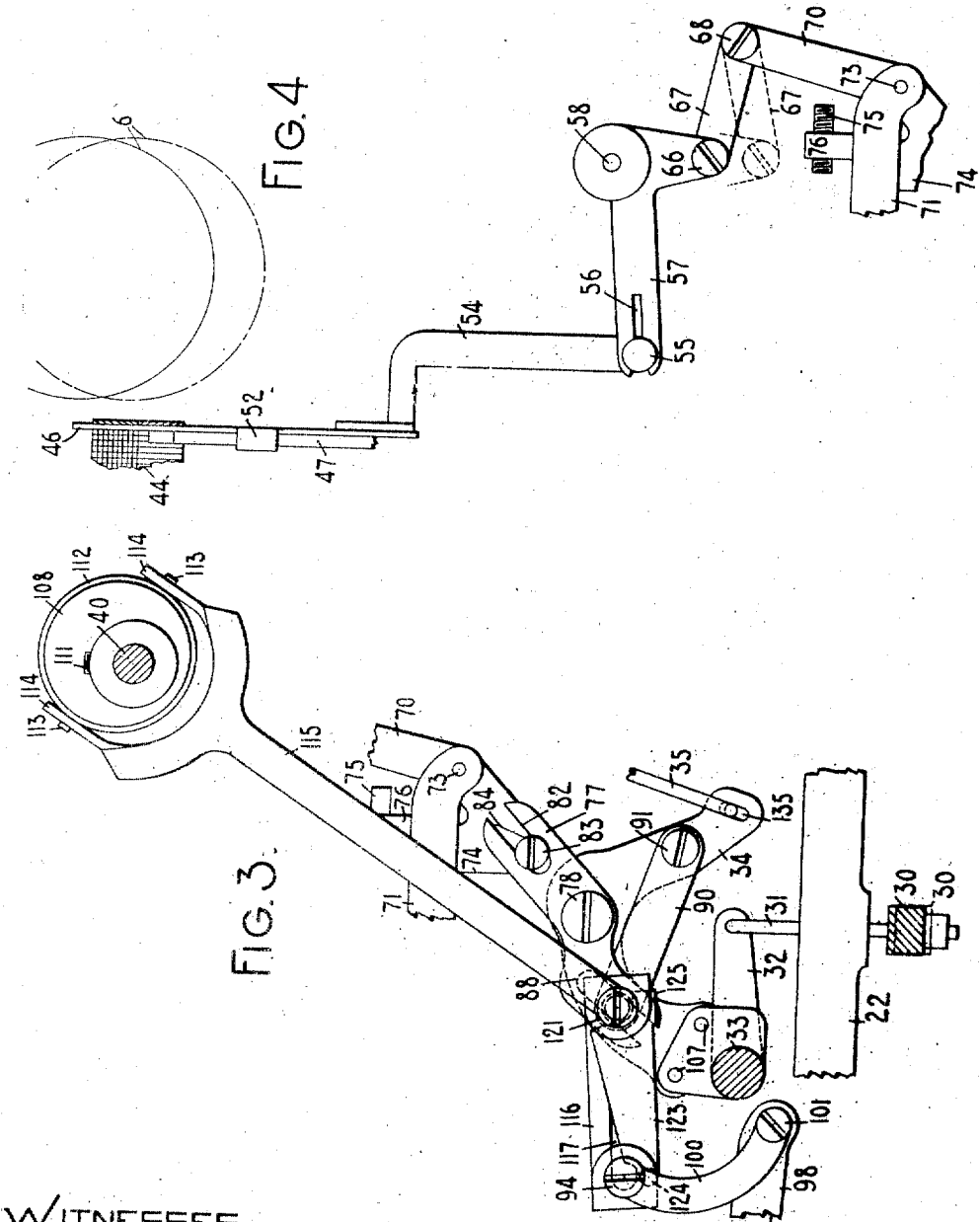

990,920.

Patented May 2, 1911.
6 SHEETS—SHEET 4.

A. W. STEIGER.
TYPE WRITING MACHINE.
APPLICATION FILED JAN. 28, 1910.

990,920.

Patented May 2, 1911
6 SHEETS—SHEET 5.

WITNESSES:
E. M. Wells.
R. H. Strother.

INVENTOR:
Andrew W. Steiger
By Jacob Felbel
HIS ATTORNEY

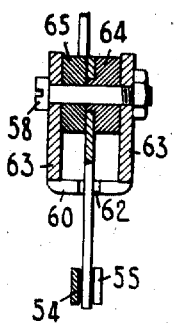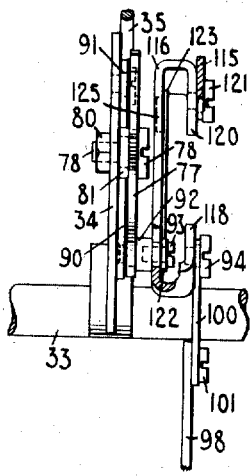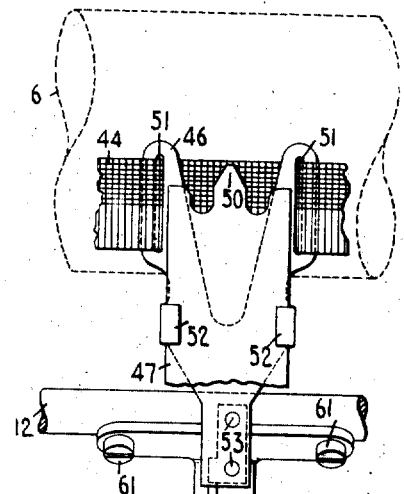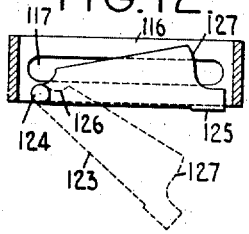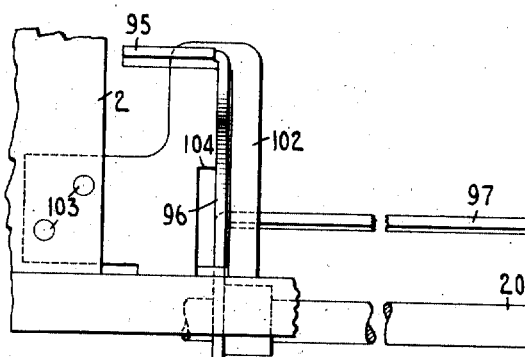

UNITED STATES PATENT OFFICE.

ANDREW W. STEIGER, OF BRIDGEPORT, CONNECTICUT, ASSIGNOR TO REMINGTON TYPEWRITER COMPANY, OF ILION, NEW YORK, A CORPORATION OF NEW YORK.

TYPE-WRITING MACHINE.

990,920.

Specification of Letters Patent.

Patented May 2, 1911.

Application filed January 28, 1910. Serial No. 540,542.

*To all whom it may concern:*

Be it known that I, ANDREW W. STEIGER, citizen of the United States, and resident of Bridgeport, in the county of Fairfield and State of Connecticut, have invented certain new and useful Improvements in Type-Writing Machines, of which the following is a specification.

My invention relates to typewriting machines and more particularly to the ribbon vibrating mechanism of visible typewriters.

My invention has for its principal object to provide improved means for controlling the height to which a ribbon vibrator is thrown at each key stroke in order to vary the widthwise part of the ribbon that is brought into use. I have provided mechanism including a hand-operated device by which the vibrator can be caused to bring either one of a plurality of stripes of the ribbon to the printing point, and also an automatically operated device for causing the height to which the vibrator is thrown to be varied progressively in order to use up the entire width of a ribbon. Both of these devices are present in the machine and can be used alternatively, the latter one when a single color ribbon is used, and the former when a ribbon is used having stripes of different sorts of ink, such for example, as black ink and red ink.

I attain the above and other ends by novel and improved devices. These devices are employed in a machine in which the platen shifts, and they operate in either position of said platen.

My invention consists in the features of construction and combinations and arrangements of parts hereinafter set forth and particularly pointed out in the claims.

Figure 5:
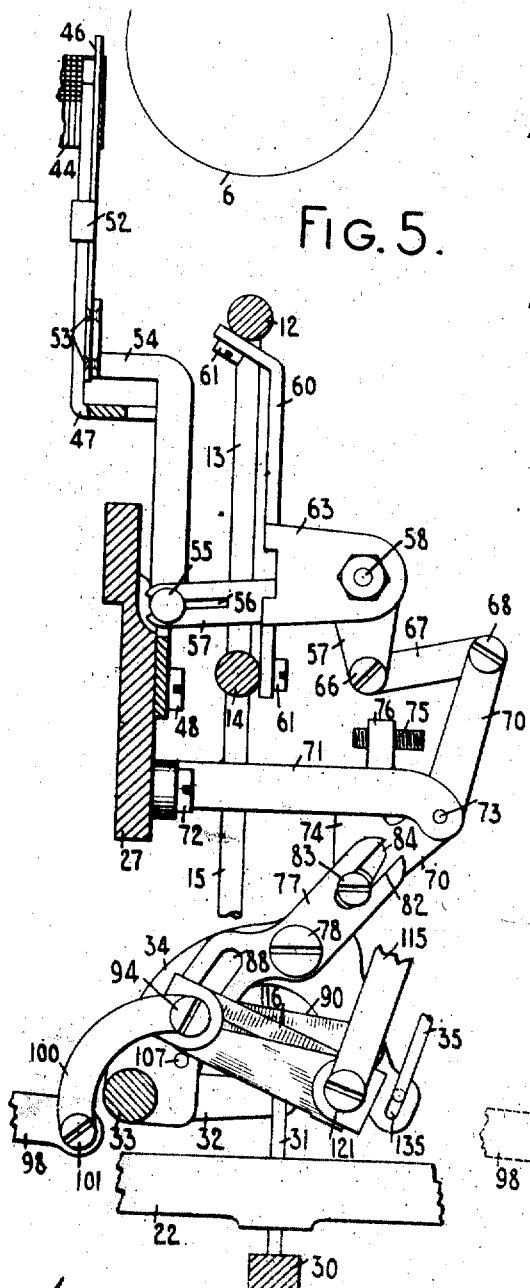
Figure 6:
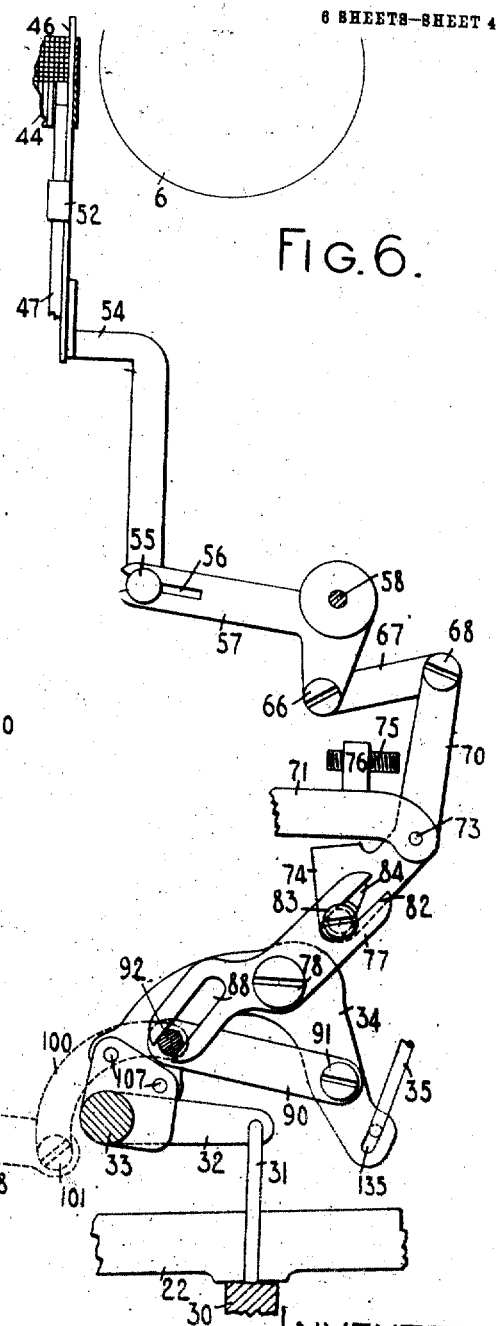
Figure 7:
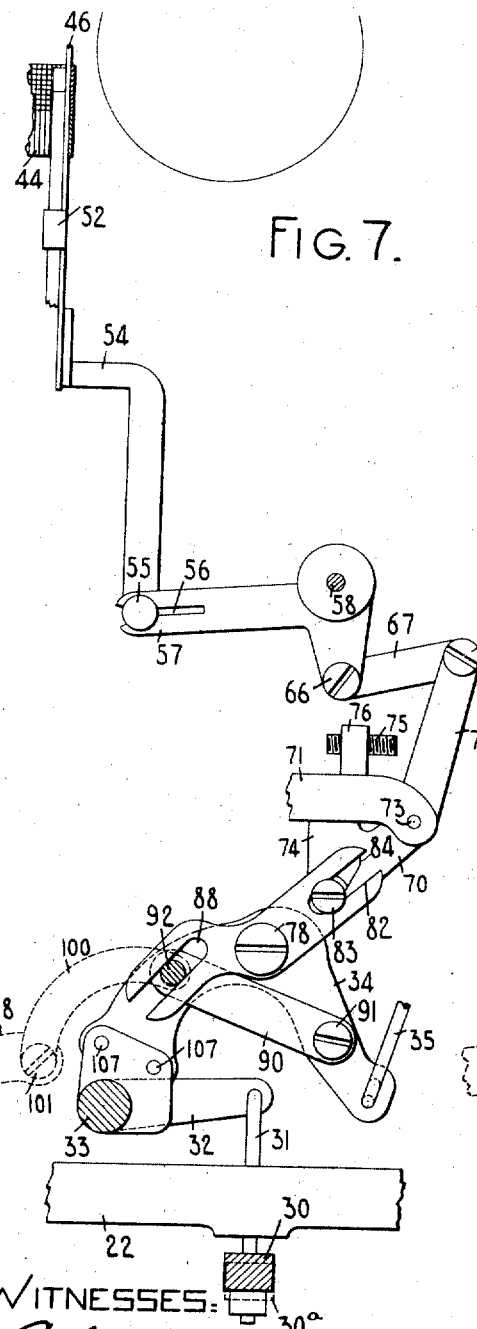
Figure 8:
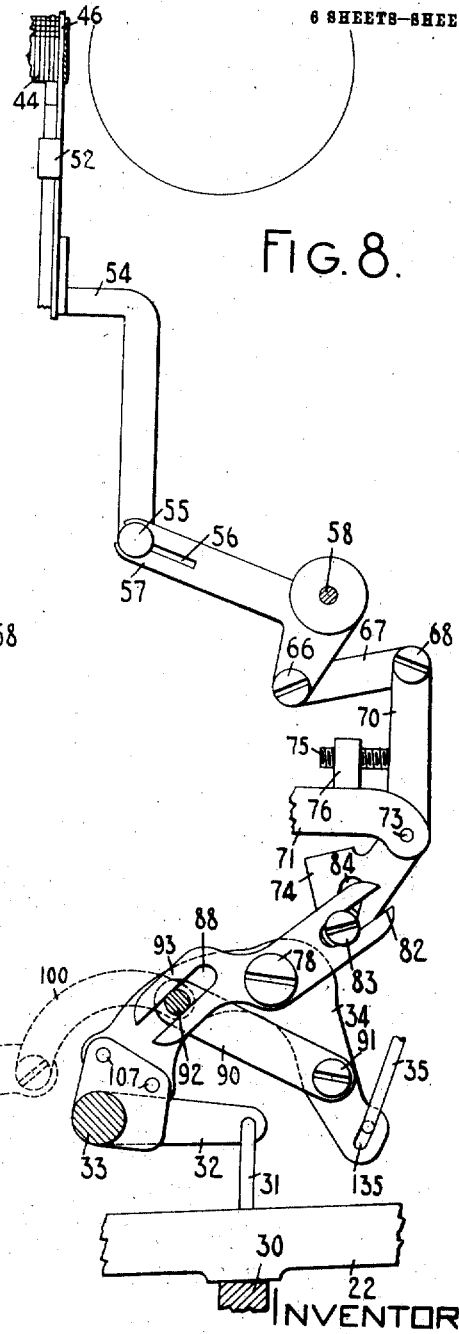

In the accompanying drawings, Figure 1 is a front to rear vertical section of so much of a typewriting machine as is necessary to illustrate the application of my invention thereto, and having my invention embodied therein. Fig. 2 is a somewhat similar view but on a larger scale, with parts omitted and parts broken away, and illustrating the mechanism employed with a one color ribbon with the automatic cross feed in operation and with said cross feed in the position it occupies when ready for printing from the upper part of the ribbon. Fig. 3 is a view similar to the lower part of Fig. 2 but showing the automatic cross feed in position for printing from the lower part of the ribbon. Fig. 4 is a view similar to the upper part of Fig. 2 but showing the two-color ribbon in the machine and illustrating diagrammatically the manner in which the platen can be shifted without affecting the relation of the vibrator thereto. Fig. 5 is a view similar to Fig. 2 but illustrating some parts not shown in said Fig. 2, and showing a two-color ribbon with the mechanism set to print from the upper stripe of said ribbon, and with the parts in normal positions. Fig. 6 is a view showing the same setting as shown in Fig. 5, but showing the parts in operated positions. Figs. 7 and 8 are similar views but with the parts set to print from the lower part of the ribbon, the mechanism being in normal position in Fig. 7, and in operated position in Fig. 8. In Figs. 5, 6, 7 and 8 some of the devices have been omitted in order more clearly to illustrate the principle of the mechanism. Fig. 9 is a fragmentary front view of the mechanism shown in the preceding figures, with parts omitted and parts broken away. Fig. 10 is a horizontal sectional view through the devices which support the vibrator operating lever. Fig. 11 is a fragmentary top view partly in section and partly broken away, and showing the connections between the controlling devices and the devices which operate the vibrator. Fig. 12 is a side view, in section, of a certain link forming part of the connection shown in Fig. 11.

My invention is applicable or adaptable generally to visible typewriters but it is here shown applied to a Remington machine.

The main frame of this machine comprises a base 1, corner posts 2 and a top plate 3, which supports stationary rails 4 on which runs a carriage truck 5. A platen 6 is mounted in a platen frame 7 which is supported on said truck by means of links 8 so that said platen frame can be shifted up and down for upper and lower case printing. Said platen frame comprises a cross bar 10 on which is journaled a roller 11 that rides on a shift rail 12. Said rail is supported by posts 13 which are carried by a transverse bar 14 which in turn is supported by rods 15 each at its lower end pivoted at 16 to a shift key lever 17, which at its forward end carries a shift key 18. There is one of these shift keys at each side of the machine, and they are both carried by a cross rod 20 mounted in the base 1. The platen normally stands in its lower position, shown in Fig. 1, but it can be shifted upward by depressing either of the keys 18. The rail 12, cross bar 14 and posts 13 and 15 constitute a shifting frame for controlling the shift of the platen.

The printing keys 21 are carried on key levers 22 which are connected by links 23 with sub-levers 24, which in turn are connected by links 25 with front-strike type bars 26, said type bars being mounted on a stationary segment 27 by means of hangers 28.

A universal bar 30 is hung by rods 31 to arms 32 projecting rearward from a transverse rock shaft 33, which is pivoted at its ends in the base of the machine. Near its middle this rock shaft 33 has projecting therefrom an arm 34 which is connected by a link 35 with the escapement mechanism of the machine.

The carriage feed mechanism includes a spring drum 36 which is connected with the carriage by means of a strap 37. This spring drum drives a beveled gear 38 that meshes with another bevel gear on a transverse driving shaft 40 which in turn carries at each of its ends a beveled pinion that meshes, or is adapted to mesh, with a beveled gear 41 mounted on the rear end of a ribbon spool shaft 42. Each of said shafts 42 carries a ribbon spool 43 and the ribbon 44 is led upward from the spool through a hole in the top plate, thence over a curved guide 45 and through a ribbon vibrator 46, and thence across to the guide and spool at the other side of the machine. The driving shaft 40 is arranged to be shifted lengthwise to gear it to one or the other of the spools in a manner well known in the art.

The vibrator and its associated parts can be best understood from Figs. 5 and 9. A bracket 47 is secured by screws 48 to a fixed part of the machine, the type bar segment 27 being used to support said bracket in the present instance. This bracket extends up to a point in front of the platen and a little below the writing line and terminates in a printing point indicator or pointer 50. The vibrator consists of a plate of sheet metal having at its upper end two arms with a space between them for the type to strike through, and each of said arms is formed with a slot 51 through which the ribbon is threaded. The vibrator lies just back of the bracket 47 which constitutes a guide for said vibrator. To this end two ears 52 are bent off from the right and left hand edges of the vibrator and are bent around the edges of the guide or bracket 47 so as to hold the vibrator in place and leave it free to move up and down. The lower end of the vibrator is secured by rivets 53 to a bar or stem 54 which at its lower end has a headed pin 55 projecting therefrom into a slot 56 in the forward end of one arm of a bell crank 57 which constitutes the operating lever for the vibrator. The lever 57 is pivoted at 58 in a bracket 60 which is secured by screws 61 to the shift rail 12 and the cross bar 14 of the platen shifting frame so that said pivot 58 moves up and down with the platen when the latter is shifted. The bracket 60 consists of a piece of sheet metal, T-shaped at its upper end as shown in Fig. 9, and having a slot 62 through which the lever 57 plays. The bracket 60 has two ears 63 bent back from its edges and the pivot 58 passes through said ears as shown in Fig. 10. Two washers 64, 65 surround the screw 58 and one of said washers is shouldered as shown to provide a bearing for the lever 57, the two washers together constituting a guide to prevent wabbling of the lever.

The depending arm of the lever 57 has pivoted thereto at 66 a rearwardly extending link 67 which at 68 is pivoted to the upwardly extending arm of a lever 70 of the first order. Said lever 70 is mounted in a slot in the rear end of a bracket 71 which is secured by screws 72 to the rear face of the type bar segment 27, the lever 70 being pivoted on a pin 73. The lower arm of the lever 70 is formed with a stop lug 74 which normally contacts with the underside of the bracket 71 to limit the motion of the lever in one direction and the motion of said lever in the other direction is limited by an adjusting screw or stop 75 which is threaded into a post 76 of the bracket 71.

As illustrated in Fig. 4, the link 67 is so disposed that when the platen is shifted to the upper position shown in full lines in said figure, said link extends forward from the pivot 68 at a slight upward angle and when the platen is dropped down to the position shown in broken lines, said link extends forward at about the same inclination downward so that the lever 57 stands at the same angle in both positions of the platen, notwithstanding the fact that the ribbon vibrator moves up and down with the platen.

The lever 70 is operated by the arm 34 that projects from the rock shaft 33 and the variations in the throw of the vibrator are brought about by changing the operation of this arm 34 on the lever 70. To this end the arm 34 is made with an upward angle as shown and at said angle a lever 77 is mounted on said arm 34 by means of a pivot screw 78. The pivot screw 78 is made with a shoulder as indicated by dotted lines in Fig. 9 and the left-hand end of said screw has a nut 80 threaded thereon to hold the screw in place. A washer 81 holds the lever 77 a short distance to the right of the arm 34.

The upper arm of the lever 77 has a radial slot 82 therein which embraces a headed pin 83 projecting from the lower arm of the lever 70. In order to provide for an adjustment to regulate the leverage of the universal bar on said lever 70, the pin 83 is made adjustable along a slot 84 in said lever 70. To this end said pin consists of a shouldered and headed screw that passes through said slot 84 and is secured in position in the manner illustrated in Fig. 9. A washer 85 is mounted on the screw between the shoulder of said screw and the right-hand face of the lever 70 and on the left-hand side of said lever there is mounted on the screw a washer 86 and a nut 87. By loosening said nut the screw can be moved lengthwise of the slot 84 and it can be secured rigidly in adjusted position by tightening the nut. The lower arm of the lever 77 is off-set toward the front of the machine as shown and has a longitudinal slot 88 formed therein, this slot not extending radially of the lever.

A link or controller 90 is pivoted to one side of the arm 34 on a pivot screw 91 and the forward end of this link has a shouldered rivet 92, (Fig. 11) that is adapted to play in the slot 88 in the lever 77. The relation of the several parts is such that if the link 90 be turned about its pivot to move the pin 92 along the slot 88 this will result in turning the lever 77 about its pivot 78 and thus changing the relation of said lever 77 to the rock shaft 33 and to the universal bar. But when said link is held in any one position and the pin 92 retained in any one position in the slot 88, then the lever 77 is rigid on the arm 34 and becomes in effect merely a part or extension of said arm. Considering the rock shaft 33 and its arms 32 and 34, 77, as a lever, the effect of adjusting the link 90, is to change the angular relation of the arms of said lever.

The rivet 92 has a screw 93 and another screw 94 co-axial therewith, and the connections of these screws will be explained presently. When the parts are in the positions shown in Fig. 7 it will be noted that the stop lug 74 is in contact with the bracket 71 which limits the upward motion of the universal bar. If now a key be depressed the parts will move to the positions shown in Fig. 8 and the lever 70 will make its full extent of motion and be arrested by the stop screw 75. If the controlling link 90 be moved down to the position shown in Fig. 5, the lever 77 will be rocked about its pivot 78, the lower end of said lever moving toward the rear of the machine. This tends to move the upper end of the lever toward the front of the machine but, as the stop lug 74 is resting against the bracket 71, the upper end of the lever 77 cannot move toward the front. The arm 34 is therefore moved slightly toward the rear, dropping the universal bar down to the position shown in Fig. 5, this position being indicated by broken lines at 30ª in Fig. 7. The position 30ª of the universal bar is an intermediate position between the position shown in full lines in Fig. 7 and the depressed position shown in Fig. 8. It will be seen that the downward adjustment of the link 90 drops the universal bar down without moving the ribbon vibrator. The result is that when a key is operated and the universal bar moved down to the position shown in Fig. 6, the vibrator is operated through a less distance than in Fig. 8 and it brings the upper stripe of the ribbon to printing position. It will, of course, be understood that intermediate parts of the ribbon can be brought to printing position by setting the link 90 to positions intermediate that shown in Fig. 7 and that shown in Fig. 5.

The hand operated means for shifting the link 90, comprises a handle 95 formed on the forward end of a lever arm 96, the rear end of which is pivoted on the cross rod 20, the handle 95 standing beside one of the corner posts 2 and in or convenient to the keyboard of the machine. The lever arm 96 is connected by a yoke-bar 97, (Fig. 9) with a rearwardly directed lever arm 98 which is pivoted on the rod 20 approximately in front of the arm 34. At its rear end the arm 98 has a link 100 pivoted thereto at 101, and the pivot screw 94 above referred to passes through the upper end of said link. In Figs. 5–8 the position of the link 100 is indicated by broken lines and it will be seen that if the machine contained only the hand control and not the automatic control the pivot screw 94 might be threaded directly into the pin or rivet 92. In the construction actually shown the screw 94 is indirectly connected with the pin 92 and the action is the same as if it were directly connected to said pin. It will be seen that when the handle 95 is in the position shown in Fig. 1 the links 100 and 90 will occupy the positions shown in Figs. 5 and 6 and the machine will be set to print from the upper stripe of the ribbon; and that if the said handle 95 be depressed the links 100 and 90 will be moved up to the positions shown in Figs. 7 and 8 and the machine will be set to print from the lower stripe of the ribbon. The forward end of the lever 96 passes through a guide slot in a bracket 102 which is secured to one of the corner posts 2 of the machine by means of screws 103. Said guide slot has an off-set forming a shoulder 104 (Fig. 9) so that when the handle 95 is depressed it can be pushed a little to the left and the arm 96 be caught under said shoulder and held in depressed position. The parts are turned to the position shown in Fig. 1 by means of a coiled spring 105 which is connected at one end to the yoke-bar 97 and the other end to a pin 106 (Fig. 9) projecting from the arm 34 so that this spring serves both as a returning spring for the lever 96 and also as a returning spring for the universal bar. It may be noted that the arm 34 is here shown as built up by inserting a sheet metal arm into a lug projecting from the shaft 33 and securing said sheet metal arm in place by rivets 107. It may also be remarked that when the parts are in the positions shown in Figs. 7 and 8, the link 100 is not co-axial with the shaft 33 so that when said shaft is rocked by the depression of the universal bar to the position shown in Fig. 8 the pin 92 is caused by the link 100 to slide a short distance in the slot 88. This slightly modifies the action but the parts are so adjusted as to give the right extent of throw to the vibrator. When the parts are in the position shown in Fig. 5 the pin 92, the shaft 33 and the pivot 101 are more nearly in a straight line so that when the universal bar is depressed to the position shown in Fig. 6 the pin 92 stands nearly stationary in the slot 88.

The automatic shift of the link 90 is effected from the ribbon drive shaft 40 by means of an eccentric 108 having a hub 110 which is secured to said shaft by a set screw 111. Said eccentric has a strap 112 from which two pins 113 project into the branches 114 of a bifurcated link or connecting rod 115, the lower end of which is connected with devices whereby the connecting rod 115 and the link 100 can be caused alternatively to control the link 90. These devices can be best understood by reference to Figs. 2, 5, 11 and 12. A link 116 is formed with a long slot 117 and the forward end of said link is bent back forming an ear 118, and the rear end of said link is similarly bent forward forming an ear or branch 120. The pivot screw 94 at the upper end of the link 100, is threaded into the ear 118 and the lower end of the connecting rod 115 is pivoted to the ear 120 by means of a pivot screw 121. The rivet or pin 92 is formed on its right-hand end with a reduced part that passes through the slot 117 and the screw 93 is threaded into the end of said pin 92. A washer 122 lies between the head of said screw 93 and the link 116. The construction is such that the link 116 can be slid along the pin 92 and when said link is in its rearmost position shown in Fig. 5 the screw 94 is substantially co-axial with the screw 93 and the pin 92 so that said pin 92 and the link 90 are placed under the control of the link 100 and the handle 95. When the parts are in this position the up and down motion of the connecting rod due to the rotation of the eccentric 108 merely rocks the link 116 about the pin 92 as a center without affecting said pin so that said connecting rod 115 has no effect on the link 90.

When the link 116 is shifted to its extreme forward position shown for example in Fig. 2, the screw 121 is substantially co-axial with the pin 92 and the screw 94 stands out in front of said pin as shown in Fig. 2. In this position of the parts the rotation of the eccentric 108 moves the pin 92 and link 90 slowly back and forth between the positions shown respectively in Figs. 2 and 3 and in the first of which the parts are set to cause the ribbon to print from the upper part thereof and in the other of which the print will be from the lower part of the ribbon. In intermediate positions of the eccentric the print will be from the intermediate parts of the ribbon. As the shaft 40 turns, the parts are slowly moved from one of these positions to the other, and, as the ribbon is being fed longitudinally at the time, the printing will take place along a sinuous line on the surface of the ribbon and the entire width of the ribbon will be utilized. When the connecting rod 115 is thus in operation on the ribbon mechanism it is immaterial in which position the handle 95 stands as any up and down motion of the link 100 will merely swing the link 116 about the pin 92 as a center without affecting said pin.

In order to retain the link 116 in either of its two positions I have mounted thereon a latch 123, said latch being pivoted to the link at 124 and the free end of the latch being bent under the link at 125. The latch 123 is formed at its ends with shoulders 126 and 127 which, when the latch is in its operative position shown in full lines in Fig. 12, closes the middle part of the slot 117 and confines the pin 92 to one end of said slot. The latch is made of thin metal and slightly bent inward toward the link 116 so that when it is up in operative position it is retained in such position by friction, but the latch can be pulled down to the position shown in broken lines in Fig. 12 in order to shift the link 116. This link 116 is omitted from Figs. 5–8 in order to avoid confusion in the showing.

If the automatic crosswise feed is not wanted in the machine the link 116 and the eccentric 108 and connected parts can be omitted and the link 100 connected directly with the pin 92. If on the other hand it is desired to have an automatic cross feed and not the hand control, then the handle 95 and connected parts can be omitted, together with the link 116, and the lower end of the connecting rod 115 can be connected directly with the pin 92. The shaft 40 has an endwise movement for the purpose of reversing the direction of ribbon feed and of course the eccentric 108 is carried with it. This motion is slight, however, in comparison with the length of the rod 115, and does not harm.

The escapement comprises feed dogs 130 which coöperate with an escapement wheel 131 which is connected with the carriage by means of a rack 132 and pinion 133. The dogs 130 are mounted on a dog rocker 134 having a horizontal arm to which the link 35 is connected. Said link at its lower end is preferably pivoted in a slot 135 in the arm 34 and when the universal bar is dropped down to the position 30ª, said link is in the upper end of said slot. When said universal bar is in its highest position, there is lost motion between the arm 34 and the link 35. As the universal bar is always moved down to the same point by the depression of a key, the action of the escapement is the same in all settings of the ribbon-controlling device.

Various changes may be made in the details of construction and arrangement without departing from my invention.

What I claim as new and desire to secure by Letters Patent, is:—

1. In a typewriting machine and in ribbon mechanism, the combination of a ribbon vibrator, a universal bar and connections for operating said vibrator, a stop for arresting a part of said connections in normal position, means for changing the connections between said stop and said universal bar to move said universal bar up or down to change the extent of throw imparted to said vibrator, a shiftable platen, and means between said stop and said vibrator for causing said vibrator to shift with said platen.

2. In a typewriting machine and in ribbon mechanism, the combination of a two-part lever arm, a universal bar arranged to operate said lever arm, a ribbon vibrator operated by said lever arm, and means for adjusting one part of said lever arm with relation to the other in order to vary the operation of said vibrator, said adjusting means including a pivoted controlling link adjustably connecting the two parts of said lever arm.

3. In a typewriting machine and in ribbon mechanism, the combination of a ribbon vibrator, means for operating said vibrator having a controller for controlling the throw imparted to said vibrator, a link connected with said controller, a hand-controlled adjusting device connected with one end of said link, an automatic adjusting device connected with the other end of said link, and means for affording a setting of said link to bring said controller under the control of either end of said link.

4. In a typewriting machine and in ribbon mechanism, the combination of a ribbon vibrator, means for operating said vibrator having a controller for controlling the throw imparted to said vibrator, a link connected with said controller, a hand-controlled adjusting device connected with one end of said link, an automatic adjusting device connected with the other end of said link, said link having a slot that receives a pin connected with said controller, so that by moving said link endwise said controller can be brought under the control of either of said adjusting devices.

5. In a typewriting machine and in ribbon mechanism, the combination of a ribbon vibrator, means for operating said vibrator having a controller for controlling the throw imparted to said vibrator, a link connected with said controller, a hand-controlled adjusting device connected with one end of said link, an automatic adjusting device connected with the other end of said link, said link having a slot that receives a pin connected with said controller, so that by moving said link endwise said controller can be brought under the control of either of said adjusting devices, and means for retaining said link in either of its positions.

6. In a typewriting machine and in ribbon mechanism, the combination of a ribbon vibrator, means for operating said vibrator having a controller for controlling the throw imparted to said vibrator, a link connected with said controller, two adjusting devices, one connected with each end of said link, and means for affording a setting of said link to bring said controller under the control of either end of said link.

7. In a typewriting machine and ribbon mechanism, the combination with a ribbon vibrator, of means for operating said vibrator comprising a lever-arm made up of two parts connected together, a link pivoted on one of said parts and having sliding connection with the other, and means for adjusting said link to regulate the relation between the two parts of said lever-arm in order to vary the throw imparted to the ribbon vibrator.

8. In a typewriting machine and ribbon mechanism, the combination with a ribbon vibrator, of means for operating said vibrator comprising a lever-arm made up of two parts connected together, a link pivoted on one of said parts and having sliding connection with the other, and a handle and connections for adjusting said link to regulate the relation between the two parts of said lever in order to vary the throw imparted to the ribbon vibrator.

9. In a typewriting machine and ribbon mechanism, the combination with a ribbon vibrator, of means for operating said vibrator comprising a lever-arm made up of two parts connected together, a controlling link pivoted on one of said parts and having sliding connection with the other, means including a shaft for feeding the ribbon lengthwise, an eccentric on said shaft, and a connection between said eccentric and said controlling link.

10. In a typewriting machine and ribbon mechanism, the combination with a ribbon vibrator, of means for operating said vibrator comprising a lever-arm made up of two parts connected together, a controlling link pivoted on one of said parts and having sliding connection with the other, means including a shaft for feeding the ribbon lengthwise, an eccentric on said shaft, a connection between said eccentric and said controlling link, a handle for controlling said controlling link, and means for placing said link under the control of said handle or of said eccentric alternatively.

11. In a typewriting machine, the combination of printing key levers, a universal bar operated by said key-levers, an escapement operated by said universal bar, a ribbon vibrator operated by the same universal bar, means for changing the normal position of said universal bar without changing the normal position of said vibrator in order to vary the throw imparted to the vibrator, and a lost motion connection between said universal bar and said escapement whereby said escapement is operated to the same extent by said universal bar irrespective of the difference in the normal position of the latter.

12. In a typewriting machine, the combination of printing key levers, a universal bar operated by said key-levers and always moved by said key-levers to the same operated position, an escapement operated by said universal bar in the latter part only of the depression of said bar, a ribbon vibrator operated by the same universal bar, and means for changing the normal position of said universal bar without changing the normal position of said vibrator in order to vary the throw imparted to the vibrator and without varying the operation of said escapement.

13. In a typewriting machine and ribbon mechanism, the combination of a shiftable platen, a ribbon vibrator, means for shifting said vibrator with said platen, and operating means for said vibrator including a lever 70 having a fixed pivot, a stop 74 for arresting said lever 70 in normal position, a universal bar, a lever arm 34 operated by said universal bar, a device 77 adjustably mounted on said lever arm and connecting said lever arm with said lever 70, and means for effecting an adjustment of said adjustable device 77 in order to vary the throw imparted to the vibrator whether said platen be in the upper or lower case position.

14. In a typewriting machine, the combination with a ribbon vibrator, of a lever 70 operatively connected with said vibrator, a stop 74, a rock shaft 33, a universal bar connected with said rock shaft, a lever arm 34, a slotted lever 77 pivoted on said lever arm and operating said lever 70, a controlling link 90 for controlling said lever 77, and means for adjusting said controlling link.

15. In a typewriting machine, the combination with a ribbon vibrator, of a lever 70 operatively connected with said vibrator, a rock shaft 33, a universal bar connected with said rock shaft, a lever arm 34, a slotted lever 77 pivoted on said lever arm and operating said lever 70, a controlling link 90 for controlling said lever 77, and means for adjusting said controlling link.

16. In a typewriting machine and in ribbon mechanism, the combination of a universal bar, a ribbon vibrator, connections from said universal bar to said vibrator, said connections including a pivoted device, an arm pivoted to said pivoted device, and a controlling link pivoted to said pivoted device and having sliding connection with said arm and arranged, when said link is slid along said arm, to turn said arm about its pivot, and means for adjusting said link.

Signed at the borough of Manhattan, city of New York in the county of New York and State of New York, this 27th day of January, A. D. 1910.

ANDREW W. STEIGER.

Witnesses:
CHARLES E. SMITH.
E. M. WELLS.